United States Patent [19]
Gaskins

[11] Patent Number: 6,133,653
[45] Date of Patent: Oct. 17, 2000

[54] RECIRCULATING DRIVER CONTROL CIRCUIT AND METHOD OF OPERATING THE SAME

[75] Inventor: Ronald Eugene Gaskins, Kokomo, Ind.

[73] Assignee: Delco Electronics Corp., Kokomo, Ind.

[21] Appl. No.: 09/131,324

[22] Filed: Aug. 7, 1998

[51] Int. Cl.[7] .................................................. H01H 47/00
[52] U.S. Cl. ......................... 307/125; 307/116; 307/104; 361/154
[58] Field of Search ..................................... 307/125, 104, 307/116; 327/108, 109; 123/490, 499; 166/66.4; 361/154

[56] References Cited

U.S. PATENT DOCUMENTS

| | | | |
|---|---|---|---|
| 5,532,526 | 7/1996 | Ricco et al. | 307/104 |
| 5,952,738 | 9/1999 | Miller | 307/116 |

*Primary Examiner*—Albert W. Paladini
*Assistant Examiner*—Robert L. Deberadinis
*Attorney, Agent, or Firm*—Jimmy L. Funke

[57] ABSTRACT

A recirculating driver control circuit for an electrically operated device has a power supply and a controller coupled to the power supply and the device. The controller generates an on/off signal through a first output. The on/off signal has an ON state and an OFF state. The controller generates a pulse width modulated signal through a second output. The pulse width modulated signal has a first state and a second state. A first switching device is coupled to the first output of the controller and the device and receives the on/off signal. The first switching device conducts when the on/off signal is in the ON state. A second switching device is coupled to the second output of the controller and the electrical device. Energy is supplied to the device when the pulse width modulated signal is in the first state and the on/off signal is in the ON state. The device recirculates energy to power supply when the pulse width modulated signal is in the second state and the on/off signal is in the ON state.

18 Claims, 1 Drawing Sheet

RECIRCULATING DRIVER CONTROL CIRCUIT AND METHOD OF OPERATING THE SAME

TECHNICAL FIELD

The present invention relates generally to a driver circuit for controlling the operation of an electrical device. More specifically, the present invention relates to a recirculating driver circuit for an electrical device.

BACKGROUND ART

Various electronic devices require that current be supplied in a particular manner. For many electrical devices, the current must be ramped up to a peak level. Then, the current must be maintained at a second level below the peak level for a predetermined amount of time. These circuits are known as peak and hold circuits.

One example of a device that requires a peak and hold circuit is a fuel injector for an automotive vehicle. It is common, for example, that upon initially energizing a fuel injector, a peak current of approximately four amps must be reached. Thereafter, a level of one amp must be maintained during the rest of the on cycle of the fuel injector.

Commonly, a recirculating driver circuit is associated with a peak and hold circuit. A recirculating driver is a circuit that reduces the energy to be dissipated by the a module containing the peak and hold circuit. The recirculating driver circuit removes energy from the device and routes the energy back to the power supply. The recirculating driver circuit is commonly implemented using a plurality of hardware comparators. The hardware comparators are fixed in discrete components which trigger at a predetermined current, then reduce the current level to a second level below the peak level. Multiple comparators are required to hold the second level.

Several problems are associated with using hardware comparators for implementing a recirculating driver. First, implementing a peak and hold circuit is costly due to the very large number of comparators that must be used to implement such a circuit. Second, such designs may be difficult to implement due to the circuit board area required for a plurality of comparators. Third, because the comparators are "hardwired" into the system, the comparators must be configured for a particular peak and hold implementation. That is, if the characteristics needed by the electrical device are changed, for example, due to a change in the component's supplier, the comparator circuit must be changed. Such changes often require costly reconfiguration or designing and building a new circuit board.

SUMMARY OF THE INVENTION

It is therefore one object of the invention to provide a recirculating driver circuit that is less hardware specific, and is less costly to implement.

In one aspect of the invention, the recirculating driver control circuit includes a power supply and a controller coupled to the power supply. The controller generates a pulse width modulated (PWM) signal through a pulse width modulated output. The PWM signal has a first state and a second state. An electrically controlled device has an input. A switching circuit is coupled to the power supply, the controller, and the input of the device. The controller controls the operation of the switching circuit in response to the PWM signal. The switching circuit provides energy to the device during the first state of the PWM signal. The switching circuit couples the device to a power supply during the second state of the PWM signal so that the energy stored in the device is recirculated to the power supply.

In a further aspect of the invention, the controller generates an on/off signal. The on/off signal controls the operation of the device and essentially overrides the PWM signal. Thus, the device is active when the on/off signal is in the ON state.

In a further aspect of the invention, a method for controlling an electrically operated device comprises the steps of generating a PWM signal having a first state and a second state and controlling the operation of a switching circuit in response to the PWM signal. During the first state, the steps include supplying energy to the device during the first state and storing energy in the device. During the second state, the steps include coupling the device to a power supply, and recirculating energy stored in the device to the power supply.

One advantage of the invention is that by quickly changing the control strategy by which the microcontroller is operated, the peak level and hold level of the peak and hold circuit may be readily changed without complicated hardware adjustments. Another advantage is that the invention allows the flexibility to calibrate the circuit based on the characteristics of the device being driven. Still another advantage is that it requires minimum microprocessor overhead in devices which support pulse width modulated outputs.

These and other features and advantages of the present invention will become apparent from the following description of the invention, when viewed in accordance with the accompanying drawings and appended claims.

BRIEF DESCRIPTION OF THE DRAWINGS

FIG. 2 are three signal diagrams showing the signals present in the circuit of FIG. 1 where:

BEST MODES FOR CARRYING OUT THE INVENTION

Although the invention was described and illustrated in terms of a recirculating driver peak and hold circuit for a fuel injector, it will be appreciated that this invention may be used for various recirculating driver circuits having various current profiles. Also, the circuit may be employed for various other types of electrical devices in automotive and non-automotive applications.

Figure 1:
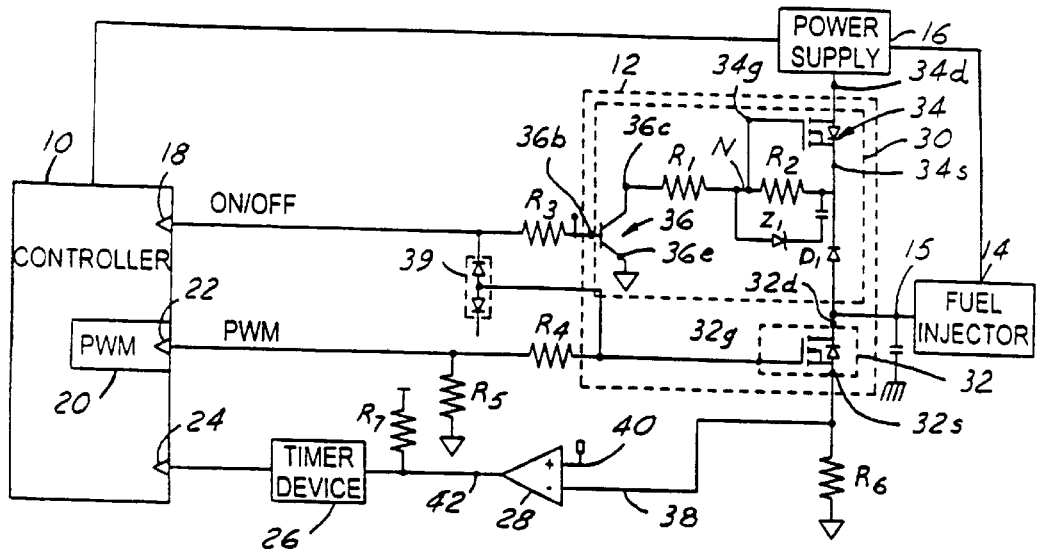
FIG. 1 is a block diagram/schematic of a recirculating driver circuit according to the present invention.

Referring now to FIG. 1, a microcontroller 10, such as a microprocessor, is coupled to a switching circuit 12. The switching circuit 12 is coupled to an electrically activated device such as a fuel injector 14. Controller 10 and switching circuit 12 are coupled to a power supply 16 which may be, for example, the battery of an automotive vehicle. In the case of a fuel injector, power supply 16 may be an ignition voltage derived from the battery of the vehicle through an ignition module.

Figure 2A:
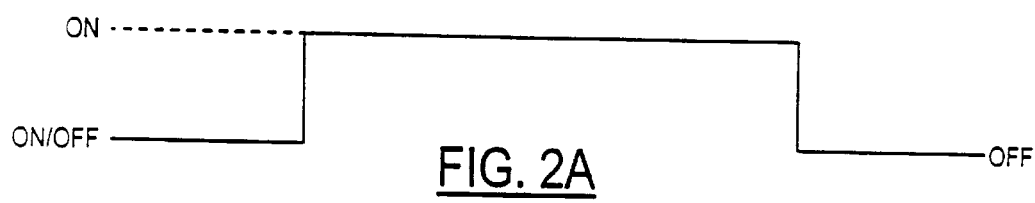
FIG. 2A is an ON/OFF signal.

Controller 10 is preferably part of an ignition module commonly used to control the operation of fuel injector 14. Controller 10 has an on/off signal output 18 that, through switching circuit 12, controls the operation of fuel injector 14 as will be further described below. The on/off signal is shown in FIG. 2A.

Figure 2B:
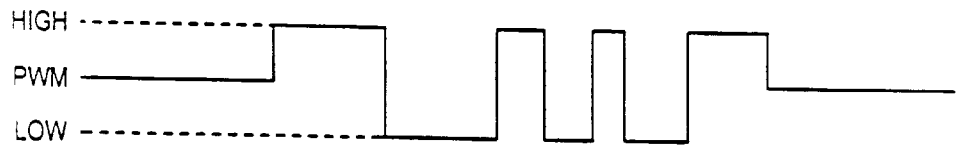
FIG. 2B is a PWM signal.

Controller 10 also preferably has a pulse width modulator 20 contained as part of its internal circuitry. The pulse width modulator 20, however, may also be a stand-alone circuit. Controller 10 has a pulse width modulated (PWM) output 22. The pulse width modulated signal has a first state and a second state that corresponds to high values and low values of the pulse width modulated output. This is best shown in FIG. 2B.

Controller 10 may also have an input 24 as an optional feature of the circuit. Input 24 may be coupled directly to switching circuit 12 or through another device such as a timer device 26. Input 24 provides information regarding the operation of fuel injector 14 to controller 10. As will be further described below, timer device 26, together with comparator 28, provide feedback to controller 10 to allow controller 10 to monitor the time for fuel injector 14 to reach peak and hold current levels.

Switching circuit 12 has a first switching device 30 and a second switching device 32. The type of switching devices depends on the electrically activated device to be driven. First switching device 30 and second switching device 32 in the case of a fuel injector 14 are preferably field-effect transistors (FETs). The terminology used to describe first switching device 30 and second switching device 32 will therefore use FET terminology. Second switching device, for example, has a gate 32g, a drain 32d, and a source 32s.

First switching device 30 may be a combination of devices such as FET 34 and a bipolar junction transistor (BJT) 36. FET 34 has a drain terminal 34d, a gate terminal 34g, and a source terminal 32s. BJT 36 has a base terminal 36b, a collector terminal 36c, and an emitter terminal 36e. The combination of FET 34 and BJT 36 acts substantially as a single switching device. Collector terminal 36c is coupled to source terminal 32s by a series combination of a resistor $R_1$ and parallel combination of resistor $R_2$ and a Zener diode $Z_1$. A common node N between resistor $R_1$ and resistor $R_2$ is also coupled to gate terminal 34g. Base terminal 36b is coupled through a resistor $R_3$ to on/off output 18 of controller 10. Drain terminal 34d is coupled to power supply 16. Source terminal 34s is coupled to fuel injector 14 through a diode $D_1$.

First switching device 30 operates in response to the on/off signal, which has an ON state and an OFF state corresponding to a high level and a low level respectively. The on/off signal is high or ON when the electrically operated device such as fuel injector 14 is desired to be operated. When on/off signal is in the ON state, both the FET 34 and BJT 36 are in the conducting state and thus power supply 16 is coupled an input 15 of injector 14 and is supplying energy thereto. When the on/off signal is in the OFF state, BJT 36 and FET 34 are in a non-conducting state and power supply 16 is not electrically coupled to fuel injector 14.

With respect to second switching device 32, drain terminal 32d is coupled to source terminal 34s through diode $D_1$. Drain terminal 32d is also coupled to fuel injector 14. Gate terminal 32g is coupled to pulse width modulated output 22 through a resistor $R_4$ and a pull down resistor $R_5$. Source terminal 32s is coupled to ground through a resistor $R_6$.

In operation of second switching device 32, when the on/off signal is in the ON state and the PWM signal is in the high state, energy is supplied to fuel injector 14. That is, FET 34 and second switching device 32 are in the conducting state.

When on/off signal is in the high state and PWM output 22 is in the low state, second switching device 32 is not conducting and first switching device 30 is conducting. Fuel injector 14 is coupled to power supply 16. Stored energy in fuel injector 14 is returned to power supply 16.

Figure 2C:
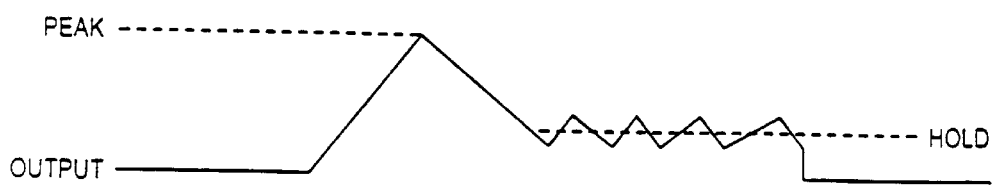
FIG. 2C is a current level of the switching circuit used to control the device.

FIG. 2C depicts the current level of switching circuit 12. This operates fuel injector 14. Thus, by controlling the PWM output, the current level to fuel injector 14 is controlled through switching circuit 12.

In the case of a peak and hold circuit, the initial high state of the PWM signal is correspondingly larger so that the peak level may be achieved. Thereafter, the duty cycle is shortened so that a second current level is achieved. The second current level may be rippled or a triangular waveform. The PWM signal allows an average second level to be maintained. Thus, by controlling the width of the PWM circuit, various output profiles may be achieved.

A gate 39 may be coupled between on/off signal output 22 of controller 10. Gate 39 acts as an AND gate so that the circuit will not activate fuel injector 14 unless both on/off signal and the PWM signal are in the ON and high state, respectively. Gate 39 is a redundancy particularly desirable for automotive applications.

Another feature of the invention is the capability of providing an adaptive feedback to input 24 of controller 10. The adaptive feedback may be the amount of time for the input device to reach a predetermined current level. To implement this, comparator 28 is used to monitor the current level and timing device 26 is used for timing the level.

Comparator 28 has an inverting input 38, a non-inverting input 40, and an output 42. Non-inverting input 40 is coupled to a reference level corresponding to an injector reference level. Inverting input 38 is coupled to source terminal 32s. Output 42 of comparator 28 changes state when the voltage at inverting input 38 rises above the injector reference. Timer device 26 is coupled to output 42. A pull-up resistor $R_7$ may also be used be used at output 42. Although timer device 26 is shown as a separate device, it may also be incorporated into controller 10. Timer device 26 may be used, for example, to monitor the time that it takes to reach a peak level. By monitoring the time that the fuel injector 14 takes to reach a peak level, controller 10 may monitor for short circuits or may be used to compensate the PWM output signal to correct for any deterioration of the electrical device due to wear.

In operation, controller 10 and hence pulse width modulator 20 may be programmed to generate a PWM signal that allows the device to attain a desired current level. In this is example, the current level is a peak and hold circuit that rises to a peak value and then reduces down to a lower current level below the peak level. Thus, when the on/off signal is in the ON state and the first switching device 30 is conducting, the pulse width modulating output signal controls the operation of second switching device to attain the desired current output to fuel injector 14.

When the on/off signal is in the on state and the PWM signal is low, energy is returned to power supply 16 while fuel injector 14 is still operating.

While the best mode for carrying out the present event has been described in detail, those familiar with the art to which this invention relates will recognize various alternative designs and embodiments for practicing the invention as defined by the following claims.

What is claimed is:

1. A recirculating driver control circuit comprising:
   a power supply;
   a controller coupled to said power supply, said controller generating a pulse width modulated signal through a pulse width modulated output, said pulse width signal having a first state and a second state;
   an electrically controlled device having an input; and
   a switching circuit coupled to said power supply, said controller and said input of said device,
   said controller controlling the operation of said switching circuit in response to said pulse width modulated signal,
   said switching circuit activating said device during said first state, and said switching circuit coupling said device to said power supply during said second state of said modulated signal
   wherein energy stored in said device is recirculated to said power supply.

2. A recirculating driver control circuit as recited in claim 1 wherein said device comprises a fuel injector.

3. A recirculating driver control circuit as recited in claim 1 wherein said controller generates an on/off signal, said controller operating said electrical device in response to said on/off signal and said pulse width modulated signal.

4. A recirculating driver control circuit as recited in claim 1 further comprising an adaptive feedback circuit coupled to said switching circuit and an input of said controller, said adaptive feedback circuit providing feedback to said controller about the operation of said device.

5. A recirculating driver control circuit as recited in claim 4 wherein said adaptive feedback circuit comprises a comparator and a timer, said adaptive feedback circuit timing the time for said device to reach a reference current level.

6. A recirculating driver control circuit as recited in claim 1 wherein said pulse width modulated signal allows a current through said device to increase to a peak value and then decrease to a second value below said peak value.

7. A recirculating driver control circuit comprising:
   a power supply;
   a controller coupled to said power supply, said controller generating an on/off signal through a first output, said on/off signal having an ON state and an OFF state, said controller generating a pulse width modulated signal through a second output, said pulse width modulated signal having a first state and a second state;
   an electrical device having an input, said device storing energy;
   a first switching circuit coupled to said first output of said controller, said power supply and said electrical device, said first switching circuit receiving said on/off signal, said first switching circuit conducting when said on/off signal is in said ON state;
   a second switching circuit coupled to said second output of said controller and said first circuit;
   said device operating when said pulse width modulated signal is in said first state and said on/off signal is in said ON state, said device recirculating energy to said power supply when said pulse width modulated signal is in said second state and said on/off signal is in said ON state.

8. A recirculating driver control circuit as recited in claim 7 further comprising an adaptive feedback circuit coupled to said switching circuit and an input of said controller, said adaptive feedback circuit providing feedback to said controller about the operation of said device.

9. A recirculating driver control circuit as recited in claim 8 wherein said adaptive feedback circuit is a comparator and a timer, said adaptive feedback circuit timing a time for said device to reach a reference current level.

10. A recirculating driver control circuit as recited in claim 7 wherein said first switching circuit comprises a field effect transistor.

11. A recirculating driver control circuit as recited in claim 7 wherein said second switching circuit comprises a field effect transistor.

12. A recirculating driver control circuit as recited in claim 7 wherein said pulse width modulated signal allows a current through said device to increase to a peak value and then decrease to a second value below said peak value.

13. A recirculating driver control circuit as recited in claim 7 wherein said device comprises a fuel injector.

14. A method of controlling an electrically operated device comprising the steps of:
   generating a pulse width modulated signal having a first state and a second state;
   controlling the operation of a switching circuit in response to the pulse width modulated signal;
   supplying energy to the device during the first state; storing energy in the device;
   coupling the device to a power supply during the second state; and
   recirculating energy stored in the device to the power supply.

15. A method of controlling an electrically operated device as recited in claim 14 further comprising the step of generating an ON signal.

16. A method of controlling an electrically operated device as recited in claim 14 further comprising the step of operating the device during an ON state.

17. A method of controlling an electrically operated device as recited in claim 14 wherein said step of generating comprises the step of generating a pulse width modulated circuit to drive the input of the device to a peak current level and thereafter maintaining the input of the device at a second current level lower than the first current level.

18. A method of controlling an electrically operated device as recited in claim 14 further comprising the step of measuring a time to reach a predetermined current level through the device.

* * * * *